Figure 1:
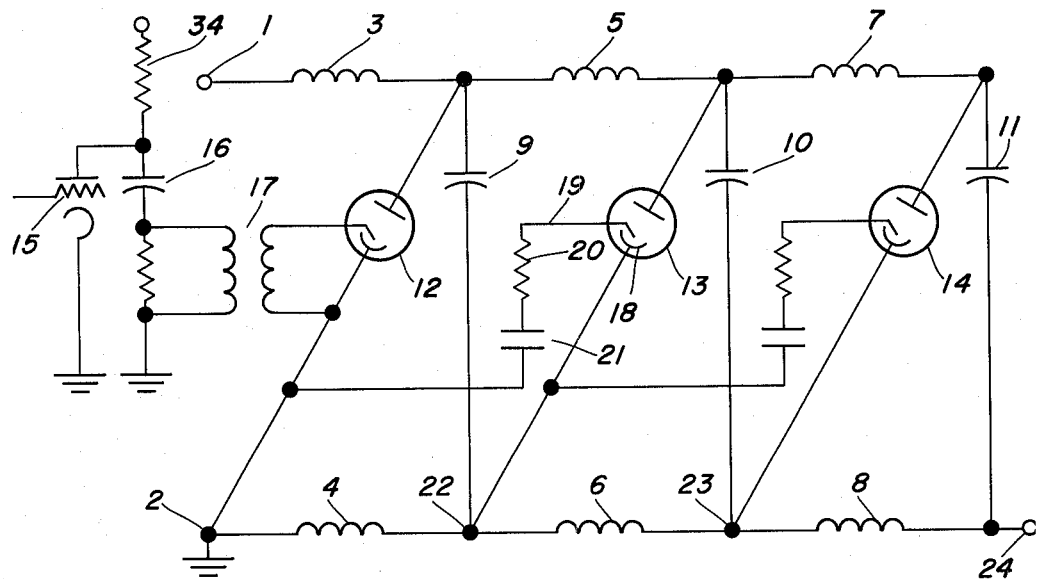

Jan. 11, 1966     A. E. SCHOFIELD     3,229,124

MODIFIED MARX GENERATOR

Filed Aug. 26, 1963

INVENTOR.
Aldred E. Schofield
BY 3,229,124
MODIFIED MARX GENERATOR
Aldred E. Schofield, Los Alamos, N. Mex., assignor to the United States of America as represented by the United States Atomic Energy Commission
Filed Aug. 26, 1963, Ser. No. 304,701
8 Claims. (Cl. 307—110)

This invention relates to voltage multipliers of the Marx type and, more particularly, a modified Marx circuit which minimizes power dissipation and embodies safety features not heretofore found in Marx generators.

Marx generators, since their disclosure to the public in 1923, have been increasingly used for impulse voltage tests on electrical apparatus, particularly when the latter is directly employed in the transmission of power. Surge voltages have always occurred on transmission and distribution systems and testing of electrical components utilizing Marx circuitry has partly served to test the ability of the apparatus to withstand the effects of surge voltages. Furthermore, large magnetic fields are common tools in the modern research laboratory. The fields are usually generated by passing very high currents through solenoid coils, said coils requiring large amounts of power during the time of interest. The capacitor bank has become the most universal system for storing and delivering this power. It can deliver very high current for short times and is relatively inexpensive when compared with other high current generators. Surge charging has several advantages for charging capacitor banks operating at high voltages. It provides high voltage from a modest supply and it charges a bank quickly, keeping the maximum operating voltage on the components for a minimum amount of time. Accordingly, the electrical components of the system have a longer operating life than would be the case otherwise. Marx generators possess special advantages in surge charging capacitor banks and the invention as described below possesses peculiar advantages not found in prior art devices.

The invention, in summary, is a device for charging capacitors in parallel and discharging them in series which comprises an input inverted L section and at least one of cascaded inverted L sections wherein said input inverted L section comprises a capacitor in the leg and inductance forming the base of the L section, an ignitron having its anode end electrically connected to the junction of the inductance and capacitor of said input L section and its cathode end to a ground point, an inductor connecting the capacitor other terminal to said ground, the junction of the inductance and capacitor being a low voltage portion during discharge while the capacitor other terminal is a high voltage portion and said at least one of cascaded inverted L sections comprises a capacitor in the leg and inductance forming the base of said section, an ignitron having its anode end electrically connected to the junction of the inductance and capacitor of said L section and its cathode end to the high voltage portion of the preceding L section, an inductor connecting the capacitor other terminal to said high voltage portion of the preceding L section, a coupling network connected to the ignitor of the ignition and to the low voltage portion of the preceding L section.

It is an object of this invention to provide a voltage multiplying circuit which will minimize power dissipation.

It s a further object of this invention to provide a modified Marx circuit wherein the output terminal of the voltage multiplying circuitry is at ground potential or substantially ground potential at all times except for about one hundred microseconds during discharge.

It is a further object of the invention to provide a device to charge capacitors in parallel and discharge them in series wherein readily available ignitrons may be used rather than expensive and custom-designed spark gaps.

The invention will be further understood with reference to the exemplary embodiment shown in the drawings and described in detail hereinbelow.

FIGURE 1 is a schematic of a three-stage modified Marx generator which can be used to charge a capacitor bank.

Figure 2:
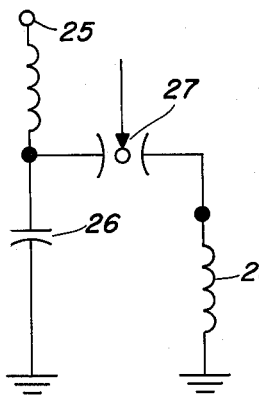
Figure 3:
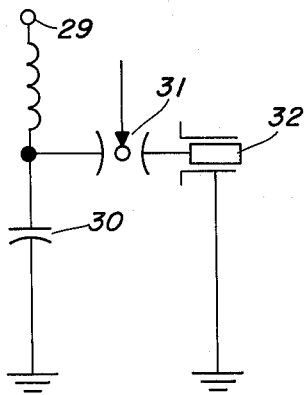
Figure 4:
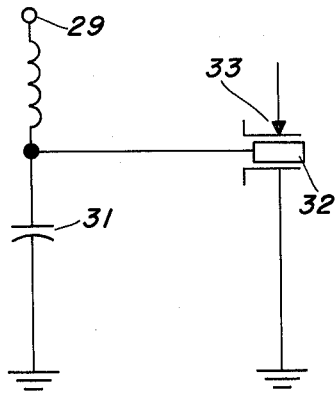

FIGURES 2, 3, and 4 are schematic illustrations of alternative load circuits utilizing the negative output of the modified Marx circuit illustrated in FIGURE 1. Although single capacitors are shown as charged, it should be understood that banks of capacitors are required in thermonuclear research.

It should be understood that throughout this specification where values are given for electrical components they are given solely for the purpose of illustrating a specific embodiment and that there is nothing critical about these voltages. For example, many of these values may differ by a factor of 10 without necessitating a change in ignitron size.

A conventional charging circuit, the positive input of which is attached at 1 and the ground at 2 may, if desired, be of constant current (e.g., 200 milliamperes at 20 kilovolts). It will be noted that inductors 3 to 8 are utilized in this modified circuitry. In the normal Marx generator, resistors are used leading to excessive power dissipation. For purposes of setting forth a specific embodiment, each of the inductors are 6 millihenries. Since the charging input at 1 is positive, the upper portion of capacitors 9, 10, and 11 are charged positively while the opposite plates are at the ground potential shown at 2. A short circuit between 1 and 2 is prevented by capacitors 9, 10, and 11, and ignitrons 12, 13, and 14. Capacitors 9, 10, and 11 may be of 28 microfarad capacitance. The ignitrons 12, 13, and 14 may be size A (GL 7703).

When it is desired to fire the Marx circuit, a triggering voltage is applied to thyratron 15 (e.g., a 3C45). Previously charged capacitor 16 (through resistor 34 of 3–5 kv.) then discharges through one coil of transformer 17. The pulse in the other coil is then carried to the ignitor of ignitron 12 causing breakdown. When ignitron 12 breaks down, the top plate of capacitor 9, formerly of positive polarity, is connected to ground 2. Accordingly, the bottom plate of capacitor 9 assumes an equal charge but of negative polarity. Consequently, cathode 18 of ignitron 13 drops in potential to this negative voltage. Clamping circuit 19 draws off a limited amount of current causing breakdown of ignitron 13. Resistor 20 in clamping circuit 19 limits the peak current drawn off while capacitor 21 limits the time during which the current is drawn off. Triggering of ignitron 13, as for the triggering of ignitron 12 switches the top plate of capacitor 10 to the voltage at point 22. Consequently, the voltage at point 23 will be approximately double that at point 22 after firing of ignitron 12 and will also be of negative polarity. The same sequence of events will yield a voltage at point 24 of three times that at point 22 and also of negative polarity. It is clear that, although a three-stage device is illustrated and described, the device may have less or additional stages in order to provide the desired voltage multiplication. Since the voltage rise at any point in the circuit is very rapid, it is evident that inductors 3 to 8 will act as open switches during the times of interest.

From the above description it can be seen that the invention may be summarized as a device for charging capacitors in parallel and discharging them in series which comprises an input inverted L network section and at least one of cascaded inverted L sections wherein said input inverted L section comprises a capacitor in the leg and inductance forms the base of the L section, an ignitron having its anode end electrically connected to the junction of the inductance and capacitor of said input L section and its cathode end to a ground point, an inductor connecting the capacitor other terminal to said ground, the junction of the inductance and capacitor being a low voltage portion during discharge while the capacitor other terminal is a high voltage portion and said at least one of cascaded inverted L sections comprices a capacitor in the leg and inductance forming the base of said section, an ignitron having its anode end electrically connected to the junction of the inductance and capacitor of said L section and its cathode end to the high voltage portion of the preceding L section, an inductor connecting the capacitor other terminal to said high voltage portion of the preceding L section, a coupling network connected to the ignitor of the ignitron and to the low voltage portion of the preceding L section.

FIGURES 2 to 4 illustrate alternative application of the negative output at 24. For example, in FIGURE 2 the negative output of the modified Marx circuit illustrated in FIGURE 1 is fed into the load circuit at 25, charging capacitor 26. When spark gap 27 breaks down, the current flows through load coil 28, load coil 28 being used to generate the large magnetic fields required in thermonuclear research.

In FIGURE 3 the output of the Marx voltage multiplier is fed into the load circuit at 29 charging capacitor 30. When spark gap 31 breaks down, hydromagnetic gun 32 fires propelling a plasma.

FIGURE 4 is a modified version of the load circuit of FIGURE 3. It will be noted that spark gap 31 is not utilized. Hydromagnetic gun 32 is, itself, used to hold off the voltage from capacitor 31. In this embodiment a spark plug 33 is provided in the coaxial gun and after this plug fires, the hydromagnetic gun is operational. It should be noted that even as there are alternative load circuits, the triggering circuit for ignitron 12 is also merely a preferred embodiment. For example, the triggering voltage may be taken directly from the thyratron cathode.

It will be seen that the modified voltage multiplying circuit illustrated in FIGURE 1 possesses several distinct advantages over prior art circuitry. First, the use of inductors prevents the power dissipation inherent in the use of resistors and is completely satisfactory in that it provides the necessary voltage holdoff. In addition, the use of clamping circuits 19 permits the use of relatively cheap and readily available ignitrons rather than the synchronized switches or spark gaps of the prior art. Ignitrons possess several advantages over the prior art switching arrangements. For example, the ignitrons used may be all of the same size. When using spark gaps in prior art devices each spark gap had to be set for a little higher breakdown voltage than the previous gap. This led to firing failures and more difficult designing. Ignitrons may be fired over a wide voltage range, hence the output may be varied over a voltage range of approximately 10 to 1 without any circuit changes. Thirdly, and perhaps most important, the above described circuit possesses inherent safety advantages not found heretofore. It is seen that output terminal 24 is, except during the exceedingly short period of discharge, connected to ground point 2 through inductors 4, 6, and 8. This means that even during charging the low resistance inductors 4, 6, and 8, produce only a small potential difference between ground point 2 and output 24. In the event capacitors 26, 30, or 31 fail to discharge to the load, the circuitry of FIGURE 1 is capable of fully dissipating this charge in a very short time. In prior circuits utilizing a positive output, the charge on the load circuit capacitor was dissipated only to a small extent and remained a hazard to workers.

The above description has served to show that the present invention yields a simpler and safer circuit than those heretofore known. It should also be noted that the circuit as described is capable of some modification. For example, if a positive output voltage is required in a particular application, the electrodes of each ignitron may be reversed and the bank charged negative. However, in this case a triggering device at each ignitron is required.

It is thus apparent that many widely different variations in the form and operation of the system of the present invention will now present themselves to one skilled in the art. As a consequence, the limitations which may appear from the description of the specific embodiment given above should be deemed limiting on the scope of the invention only to the extent that they are defined in the appended claims.

What is claimed is:

1. A circuit for charging capacitors in parallel and discharging them in series comprising means to apply a current to an ignitor circuit sufficient to fire a first ignitron, a clamping circuit between the ignitor of a second ignitron and the cathode of said first ignitron, the cathode of said first ignitron being in connection with a ground point, a capacitor in series connection with the anode of said first ignitron and the cathode of said second ignitron so that when said first ignitron fires the capacitor discharges to the cathode of the second ignitron, the firing of said second ignitron being caused by current drain-off into the clamping circuit.

2. A circuit as in claim 1 wherein the clamping circuit comprises resistor and capacitor means.

3. A circuit as in claim 1 wherein inductor means are provided to effectively open the circuit during discharge between the capacitor and the ground point.

4. A circuit as in claim 1 wherein the output is of negative polarity and the output terminal is separated from the ground point of the circuit only by inductors.

5. In a device for charging capacitors in parallel and discharging them in series, an inverted L section comprising a capacitor in the leg and inductance forming the base of said section, an ignitron having its anode end electrically connected to the junction of the inductance and capacitor of the L section and its cathode end to the other terminal of the capacitor in a preceding L section, an inductor connecting each adjacent pair of capacitors to the terminals, a coupling network connected to the ignitor of each ignitron and to the cathode end of the ignitron in the preceding L section.

6. A device as in claim 5 wherein the coupling network comprises series-connected resistor and capacitor means.

7. A device for charging capacitors in parallel and discharging them in series which comprises an input inverted L section and at least one of cascaded inverted L sections wherein said input inverted L section comprises a capacitor in the leg and inductance forming the base of the L section, an ignitron having its anode end electrically connected to the junction of the inductance and capacitor of said input L section and its cathode end to a ground point, an inductor connecting the capacitor other terminal to said ground, the junction of the inductance and capacitor being a low voltage portion during discharge while the capacitor other terminal is a high voltage portion and said at least one of cascaded inverted L sections comprises a capacitor in the leg and inductance forming the base of said section, an ignitron having its anode end electrically connected to the junction of the inductance and capacitor of said L section and its cathode end to the high voltage portion of the preceding L section, and inductor means connecting the capacitor other terminal to said high voltage portion of the preceding L section, a coupling network connected to the ignitor of the ignitron and to the low voltage portion of the preceding L section.

8. A device as in claim 7 wherein the coupling network includes series-connected resistor and capacitor means.

References Cited by the Examiner
UNITED STATES PATENTS 2,470,118  5/1949  Trevor _____ 321—15
2,836,735  5/1958  Kreutzer _____ 307—110

IRVING L. SRAGOW, *Primary Examiner.*

A. F. BERNARD, *Assistant Examiner.*